Figure 1:
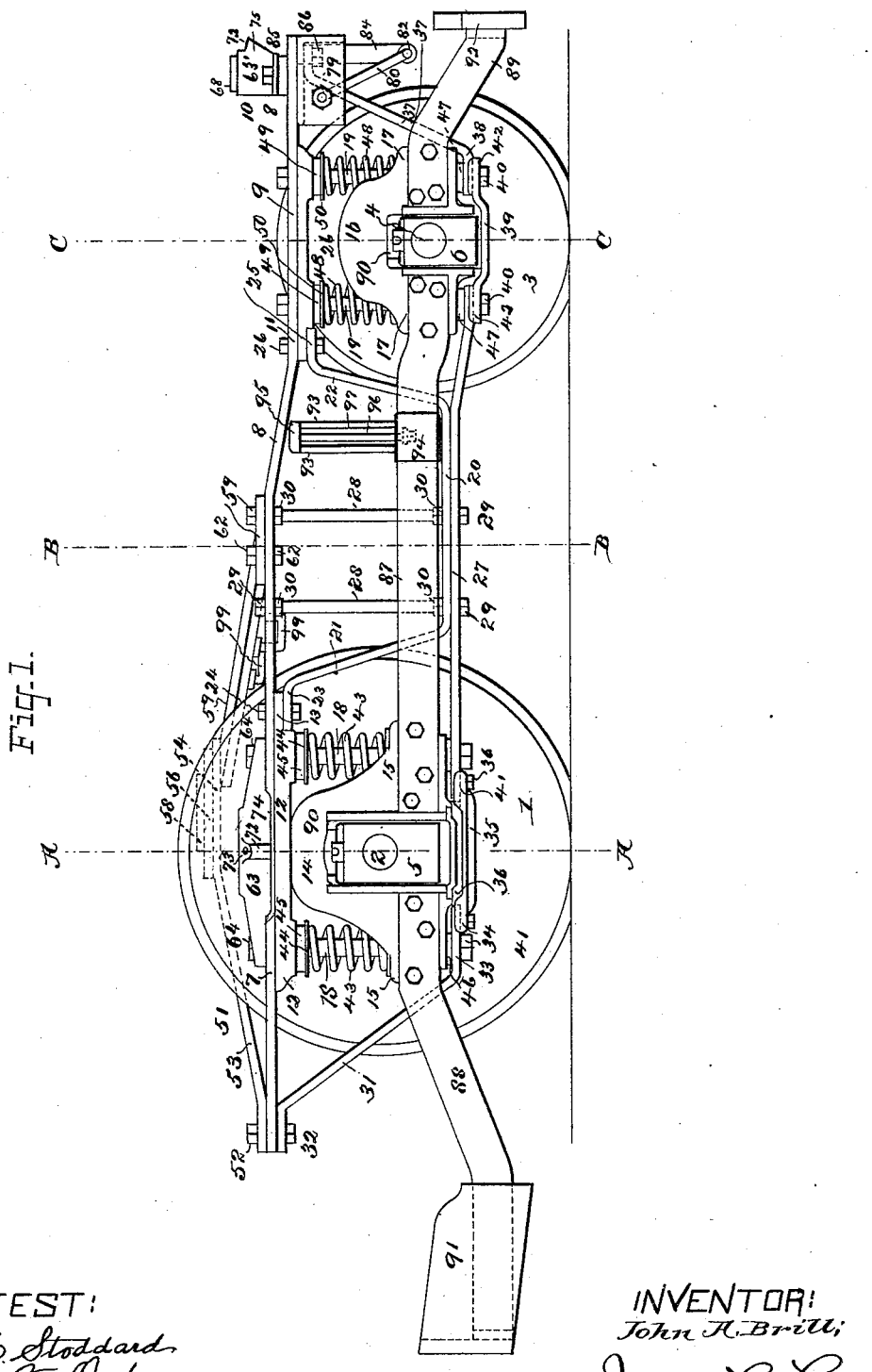

(No Model.) 3 Sheets—Sheet 1.

J. A. BRILL.
MOTOR TRUCK.

No. 480,362. Patented Aug. 9, 1892.

ATTEST:
M. E. Stoddard
H. F. Durbur

INVENTOR:
John A. Brill,
By Joseph L. Levy
Attorney

THE NORRIS PETERS CO., PHOTO-LITHO., WASHINGTON, D. C.

(No Model.) 3 Sheets—Sheet 2.

J. A. BRILL.
MOTOR TRUCK.

No. 480,362. Patented Aug. 9, 1892.

ATTEST:
M. E. Stoddard
H. F. Dunbar

INVENTOR:
John A. Brill,
By Joseph L. Levy
Attorney

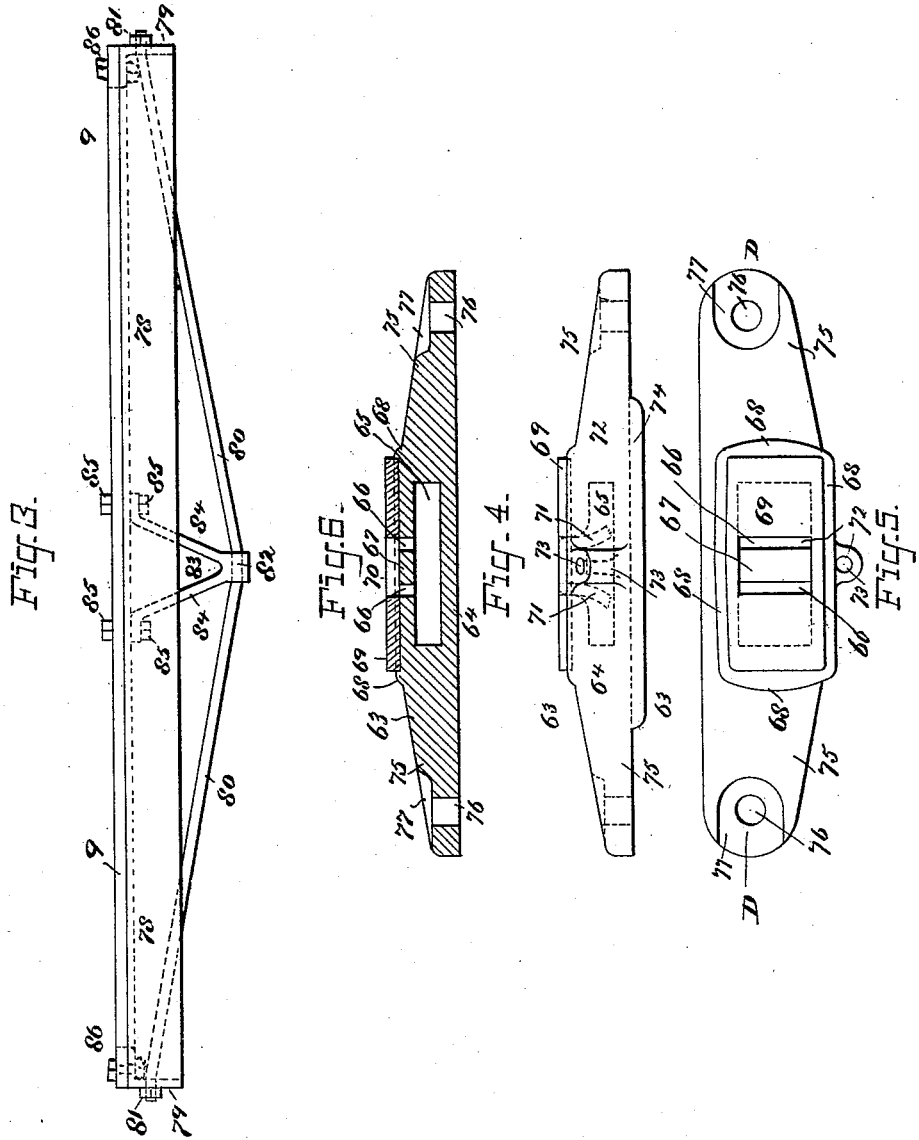

UNITED STATES PATENT OFFICE.

JOHN A. BRILL, OF PHILADELPHIA, PENNSYLVANIA.

MOTOR-TRUCK.

SPECIFICATION forming part of Letters Patent No. 480,362, dated August 9, 1892.

Application filed March 1, 1892. Serial No. 423,342. (No model.)

*To all whom it may concern:*

Be it known that I, JOHN A. BRILL, a citizen of the United States of America, and residing at Philadelphia, county of Philadelphia, State of Pennsylvania, have invented certain new and useful Improvements in Motor-Trucks, of which the following is a specification.

My invention primarily relates to that class of trucks which are designed to carry electric motors or cable-grips, wherein the parts are constructed and related to each other in such a way that the tendency is to get the maximum traction of the truck on the track. Following out this primary consideration, which is to get the maximum traction, I construct my truck in the case of a four-wheel one with two large wheels, to which the motive power and major portion of the weight of the car are adapted to be applied, and two smaller wheels at what I call the "trailing end" of the truck, although the word "trailing" is simply used to designate the position of the said wheels on the drawings, the truck being capable of being drawn in either direction, in which case the large wheel could be the trailing and the small wheel the leader.

Among the specific improvements comprised in this application is the location of the side bearings over the spring-plates, which engage the axle-box springs surrounding the axle of the large or driving wheel, or over the springs themselves if no plates are used. Hitherto, so far as I know, these side bearings have been placed upon a part of the truck-frame not directly over the spring-plates and spring-posts, but farther toward the center of the truck and removed from above the spring-plates. Although this has been found to work satisfactorily under certain conditions, under others it has caused the upper part of the truck-frame to sag by reason of the upper chord and the lower framing on the truck not giving the side bearings sufficient support. Under certain conditions this concentration of the weight of the car-body on the upper chord, instead of directly on the truck-springs, had a tendency to bow up the other or smaller end of the truck, wherein the trailing wheels are located. This bowing also was transferred to the entire bracing of the truck-frame. In the present case I place the side bearings directly over the axle-box springs, so that the composite truss or frame formed by a section of the upper chord, the spring-plates, spring-posts, and connections with the spring-posts form a rigid support for the side bearings. When this rigidity is secured, any inequality of the pressure of the weight of the car-body on the driving-axle will be avoided and the weight of the car-body will be taken directly upon the truck-springs over the axle of the driving-wheel and transferred directly to the wheel and track.

Another very important feature of my invention is as follows: I support the truck-frame on springs of varying capacity, and in following this out I place over the axle-boxes of the axle for the large or driving wheels large springs and over the axle-boxes of the axle or trailing wheels smaller springs—that is to say, I do not mean by the words "large" and "small," as used in reference to the springs, to limit myself or to be considered as referring to size only, but I refer to the capacity of the spring. By "large springs" I mean springs of greater carrying capacity than the "small springs." The springs of greater carrying capacity are, as before stated, located over the axle of the large or driving wheel, and springs of smaller carrying capacity are located over the axles of the smaller or trailing wheels. In this class of truck it is desired to get as much of the weight of the car-body concentrated upon that part of the running-gear of the truck to which the motive power is applied as possible; and to further increase the traction of the truck I place the large springs there, as before described. The large springs being the stiffer, they offer more resistance to the load than the weaker springs at the trailing end and bring more pressure to bear on the large wheels, where it is most desirable to place it. In this connection it must also be observed that the stiffness or rigidity of the large spring strengthens the composite truss or frame, as before set forth, over which the side bearings are placed, and this feature will further tend to distinguish between placing the side bearings on a less-supported part of the truck frame.

Another very important feature of my invention is the trussing of the trailing end of the truck-frame, over which end bearings or rub-plates are placed, which are adapted to co-operate with rub-plates on the car-body.

In the use of trucks of this class—those with large and small wheels, in which the pivotal center is located off from the wheel-base center of the truck (in this case approximately over the axle of the large wheel)—it has been found that the end rub-plates are necessary to keep the trailing end from lifting up, due to a preponderance of weight on the other end, for without the use of these end rub-plates pounding of the wheels, straining, and bending of the axles would follow, with the added risk of the trailing end leaving the track either when that end leads or trails. It is also a very desirable feature to have the truck-frame as light and strong as possible, and as these rub-plates, which take in a measure a portion of the weight and strain of the supported car-body, are located over a part of the truck-frame which by reason of the said economy in structure and space is not as thoroughly supported or strengthened as the other parts said part has a tendency to bend and in some cases to break entirely. The bracing avoids this by strengthening that part. The use of this bracing at the trailing end of the truck-frame is also for the purpose of giving extra support to that end of the truck-frame should the springs over the large wheels break, in which case the entire weight would be thrown on the rear part of the frame if a complete fracture were had, or if a partial fracture were had a proportionate amount of the weight of the car-body would be thrown on the rear end of the frame. A brace for that part of the truck structure I think is entirely new with me, and the specific form of bracing used tends to give great strength and support by the use of very little metal, whereby very little added weight is placed on the trucks.

My invention further includes the specific form of side bearings. They are constructed with the special view of reducing the friction of the car-body moving on the truck and at the same time giving the said car-body necessary support, the special feature of which is the combination of an anti-friction metal and a conductor for the lubricant or analogous medium, preferably felt. The side bearings are also constructed with a view of more rigidly securing them to the truck-frame, and the friction-plate, oil-well, and duct leading thereto constructed with the idea of facilitating the removal of the parts and their accessibility for the purpose of refilling the well.

Another feature in the trucks of this class is the reduction of what is known as the "wheel-base" or the longitudinal distance between the centers of the truck-axles. This is done in order to facilitate the rounding of curves and has many other advantageous features. The shortening of the wheel-base of the truck compacts the parts, and as the trucks of this special class are designed and constructed as pivotal trucks it is very important to construct and locate the truck-bolster which carries the center bearings so as to leave the space between the truck-axles free and clear as much as possible for the handling of the motor and the supporting of the same. In the present case the truck-bolster is arched and spans the axle of the driving-wheel and is composed in part of a bar or beam which extends upwardly from the sides of the truck-frame and from its point of connection therewith toward the axle of the driving-wheels or the point at which the center bearing is located. The bowing or arching of this part of the truck-bolster leaves the center of the truck free. In this connection it should be stated that the arched beam which forms a part of the truck-bolster is secured to a part of the truck-frame which is specially braced for taking the strain brought upon the truck-frame.

My invention further consists in the details of construction of the truck as not before specifically set forth, and which will be hereinafter described, and pointed out in the claims.

Figure 2:
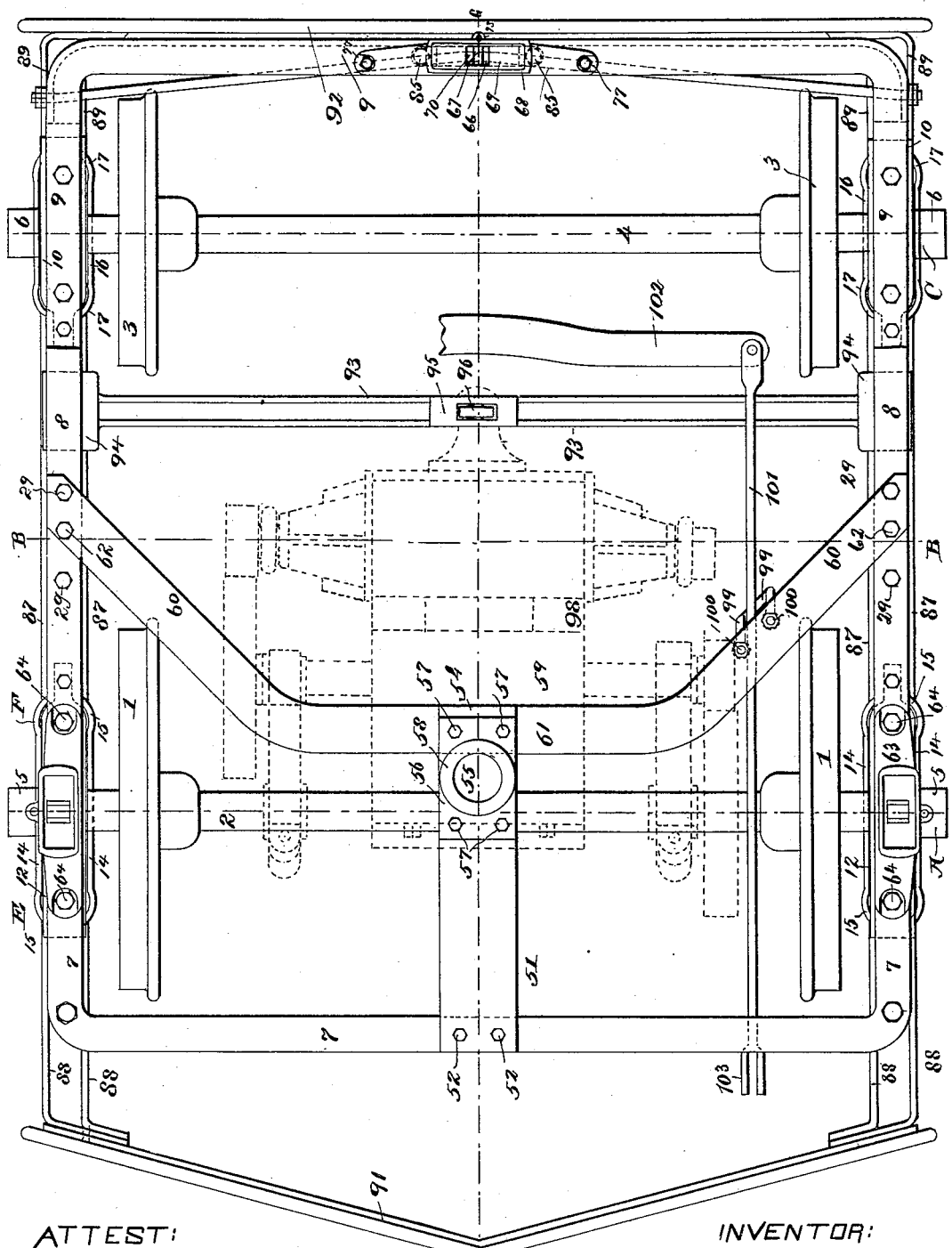

In the drawings accompanying this specification, Figure 1 is a side elevation of my improved truck, the lines A B C representing, respectively, the center of the axle of the large wheel C, the center of the axle of the small wheel, and B the wheel-base center. Fig. 2 is a plan view of Fig. 1. Fig. 3 is an end elevation of the trailing end of the truck-frame, showing the bracing therefor. Fig. 4 is a side elevation. Fig. 5 is a plan; and Fig. 6 a longitudinal sectional elevation of the side bearings, taken on the line D D, Fig. 5.

In the drawings the same letters and numerals of reference represent similar parts throughout the several views.

1 are the large or driving wheels, and 2 the axles therefor.

3 are trailing wheels, and 4 the axles therefor.

5 are axle-boxes for the driving-wheels, and 6 are the axle-boxes for the trailing wheels.

The truck-frame proper comprises the upper chord 7, which is continuous throughout and preferably rectangular in shape. One section 8 of the upper chord is inclined downwardly where it meets the depressed section 9, which forms in part the trailing end of the truck-frame. To the section 9 of the upper chord are secured the spring-plates 10, having projections 11. To the section 7 of the upper chord are secured the spring-plates 12, which are likewise provided with projections 13.

14 are the axle-box saddles of the driving-wheel running-gear, and 15 ears or projections formed thereon; 16, the axle-box saddles for the running-gear of the trailing wheels, and 17 ears or projections formed thereon. The ears 15 and 17 form supports for the axle-box saddles hereinafter described.

18 are the spring-posts, which in connection with the bracing of the truck-frame form the pedestals for the running-gear of the driving-wheels, the spring-posts 19 performing the same function for the running-gear of the trailing wheels.

20 is a reversed arch-brace, having upwardly extending and inclined sections 21 22, the section 21 being secured by its lips 23 to the projection 13 of the spring-plate 12, which is in turn secured to the upper chord by means of the nut and bolt 24, the lip 25 of the section 22 being secured to the projection 11 of the spring-plate 10 and to the upper chord in a like manner by a nut and bolt 26.

27 is a longitudinal truss, which, with other braces to be described, forms the lower chord of the truck-frame and extends between the inner spring-posts 18 and 19, respectively.

Two upright pillars 28 are secured to the upper chord and braces 20 27 within the brace 20, the ends thereof passing through the upper chord and braces 20 27, to which they are rigidly secured by the nuts 29 and lock-nuts 30. Another brace 31, having lips 32 33, is secured at its upper end to the upper chord and at the lower end to the spring-posts 18 by means of the nut 34. The cross-bar 35 is secured to the ends of braces 31 and 27 by nuts 36.

37 is another brace secured at its upper end to the upper chord and at its lower end to the upper spring-post 19, which passes through the lip 38. A cross-bar 39 extends between the spring-post 19 under the axle-boxes and is secured to the spring-posts by means of the nuts 40. The cross-bars 35 39 have recessed ends 41 42, in which the ends of braces 31 27 37 respectively rest. As the parts before described are alike on both sides of the truck, a description of one side will suffice for both.

The large axle-box springs 43 surround the spring-post 18 and at their upper ends abut against the disks 44 and the elastic cushions 45, which set in recesses in spring-plates 12, and their lower ends being seated on the ears 15 of axle-box saddles, wherein a spring-cushion may, if desired, be interposed. Blocks or cushions 46 are interposed between the ears of the saddles and the braces 31 27, the spring-posts passing through them, and in a like manner blocks or cushions 47 are interposed between the braces 27 37 and the ears 17 on the saddle 16, the spring-posts 18 19 passing them.

The foregoing describes the particular construction of truck-frame and axle-box springs, the springs 45 being those of a greater carrying capacity, as before set forth, and the springs 48 of a lesser carrying capacity. Blocks or cushions 49 and disks 50, through both of which the spring-posts 19 pass, form an abutment for the upper part of the springs 48, the blocks 49 being seated in recesses in the spring-plate 10.

The union of pillars 28 with the upper chord and braces 20 27 form a rectangular brace for the brace or support for the truck-bolster, which will be hereinafter described, of great strength and rigidity. In this connection it is not essential that the brace 20 should be present.

The construction and location of the truck-bolster is as follows: In the present case it comprises two beams or bars, one of which 51 is secured to the upper chord at one end by bolts 52 and extends inwardly and upwardly therefrom, the section 53 being inclined upwardly and the section 54 flat. Upon the section 54 is secured the center bearing 55 of any suitable construction. In this case it is composed of the flat plate 56, which is secured to the section 54 of the beam 51 by the bolts 57. The bearing proper is formed by the annulus 58, which is secured to or formed part of the plate 56. The other member of the truck-bolster, to which special reference is here made, is the arch-beam 59, said beam having the inwardly and upwardly extending section 60 and the flat transverse section 61, Fig. 2, to which the flat section 54 of the bolster-beam 51 is secured, the bolts 57 passing through it. The bolts 29 62 secure the arch-beam to the upper chord of the truck-frame. It will be noticed by special reference to Fig. 1 that this arch-beam is secured to the truck-frame upon or approximately about the wheel-base center of the truck and extends therefrom near to the axle of the large or driving wheel.

In the present case I locate the center bearing, which forms in this case the pivotal center of the truck, almost directly over the axle of the driving-wheel or just so far away from it as will allow of the maximum concentration of weight with a safe radiation of the truck, so as to bring the side bearings, upon which the greater part of the carried weight is imposed, directly over the axle-box springs.

It will be noticed by an inspection of Fig. 2 that the center bearing or pivotal center is brought within two lines drawn across the truck from the centers of the springs, said lines being lettered E and F, respectively. This brings the weight of the car-body here superposed almost directly within the field encompassed by the springs. I have found that this comparative location of the pivotal center, side bearings, and springs results in greater traction than would be attained were the side bearings located between the innermost spring and the wheel-base center. This comparative location also tends to maintain a more equal depression of both springs and a consequent evener pressure on the axle-box brasses than could be had were the pivotal center located as last described.

By reference to Fig. 1 it will be seen that the truck-bolster is in the form of an arch the apex of which is approximately over the center of the driving-wheel axle, giving great strength and rigidity. The location of the points of attachment of the elements of the same to the upper chord of the truck-frame brings the center of depression of the truck-frame between said points of connection over or approximately over the center of the driving-wheel axle. The ends of the bolster-beam 59 are placed upon the composite truss formed by the pillars 28 and the union thereof with the upper and lower chords of the truck-frame.

By reference to Fig. 2 it will be seen that by reason of the inturning of the bolster-beam 59 a clear space is had for the motor and its support between said beam and the axle of the trailing wheels. The location of the ends of the bolster-beam 59 upon or within the wheel-base center of the truck tends to equally distribute the strain brought thereon (which is not directly imposed upon the axle of the driving-wheels) between the truck-springs at both ends of the truck.

The side bearings 63 are secured to the upper chord directly over springs and the pedestals formed by the spring-posts, &c., and are held thereon by the bolts 64 on the end of the spring-posts. The structure of the side bearings is as follows, reference being had to Figs. 4, 5, and 6. A description of one will suffice: They are preferably of the lozenge-shape form shown in the drawings, although they may be given a slight curvature, if desired. The central enlarged section 64 has an internal oil chamber or well 65 of any desired configuration, and leading therefrom through the upper portion of the central section 64 are two openings or slots 66, between which is a central web 67. The central section 64 is provided with a boss 68, rectangular in shape and continuous in outline, within which a depression is made, in which depression is located a friction-plate 69, preferably of brass or some other desirable soft or anti-friction metal. The friction-plate 69 extends above the boss 68 and is provided with an opening 70, the edges of which align, preferably, with the outer edges of the slots 66. A ribbon of felt or other absorbent material 71, Fig. 4, is placed in the well 65, its body extending up through the slots 66, preferably flush with the top of the friction-plate 69 and resting on the central web 67, so that said ribbon will carry the oil or other lubricating medium up to the friction-surface, and, being flush with the top of the friction-plate 69, will by the movement of the parts thereon oil or lubricate said friction-surface. The construction of these parts also permits of expeditiously replacing the old friction-plate with a new one when the same has been worn out or fractured.

A boss 72, provided with a duct or channel 73, leading to the well 65, is cast on the outer side of the bearing, and when the said bearing is fast to the truck-frame said boss is on the outer side of the truck, as shown in Fig. 1, whereby facility in replenishing the oil-well is had. The bearing is also provided with a downwardly-extending lip or lug 74, (best seen in Fig. 4,) which embraces the top of the upper chord and securely seats the bearing on the said chord. The ends 75, which are decreased in diameter for the purpose of saving metal, are provided with holes 76 for the passage of the upper parts of the spring-posts 18 and are recessed or countersunk at 77 for the purpose of seating the bolts 64 on the spring-posts, by which the bearings are secured to the upper chord.

The bracing for the trailing end of the truck, the advantages of which have been hitherto set forth, will now be described. The end rub-plate 63', in dotted lines in Fig. 2, which may be identical in structure with the side bearings, is located on this end of the truck-frame and engages with rub-plates on the car-body. A beam 78, preferably of angle-iron, is placed under the end section 9 of the upper chord, the vertical web of which extends from the under surface of said section. At the angle of the section 9 of the upper chord said beam 78 is deflected to follow the course of the said angle, as shown at 79, Fig. 1, and extends some little distance from the end of the section 9 toward the spring-posts. This added member would under ordinary conditions sufficiently strengthen and support this end of the truck for the use of the end rub-plates; but in order to be able to meet any probable contingency I use a supplemental brace or truss, which is constructed as follows: The truss 80 is secured to the section 79 of the beam 78 by means of the bolts 81. The said truss is deflected downward and passes through the eye 82 of the bifurcated strut 83, the arms 84 of which extend up to and bear against the under side of the beam 78, the section 9 of the upper chord, the beam 78, and strut 83 being united together by the bolts 85. The bolts 86 secure the end sections 79 of the beam 78 to the upper chord.

The axle-box frame of the truck comprises side bars having central sections 87 and end sections 88 89, said sections being preferably composed of two wrought-iron bars secured to the axle-box saddles 14 16 by bolts, which bars are closely juxtaposed and are set on edge to secure strength and rigidity. An elastic block 90 may be interposed between the upper portion of the axle-boxes 5 6 and the under portion of the axle-box saddles 14 16, although this feature forms no part of my present invention, nor does the structure of the axle-box frame. Both ends of the axle-box frame are provided with life-guards 91 92, which serve in a measure to unite the side bars of the axle-box frame laterally. The side bars of the axle-box frame are further laterally united by the motor-support hereinafter described.

The support for the motor is shown in end elevation in Fig. 1 and in plan in Fig. 2. This support comprises two transverse bars 93, spaced apart, secured to thimbles 94, which thimbles are secured on the side bars of the axle-box frame. The bars 93 are set on edge and extend upwardly as they approach the longitudinal center G, Fig. 2, of the truck. The thimble 95 is secured in the apex of the arch of the bars 93, from which depends a pendant 96, which passes through the nose 97 of the motor 98, said motor being sleeved on the axle 2. This form of support for the motor I do not claim herein, as that forms the subject-matter of an application filed jointly by Walter S. Adams and myself on November 12, 1891, No. 411,752, said support being here shown for the purpose of illustrating the clearance between the bolster-beam 59 and the axle 4, the motor being shown for the purpose of diagrammatically illustrating the application of the weight and power thereof to the axle of the driving-wheels. The bolster-beam 59 is provided with a downwardly-extending hanger 99, secured thereto by the bolts 100. The hanger 99 supports the longitudinal rods 101 of the brake-rigging, to which the transverse equalizing-lever 102 is pivotally secured. The form of brake-rigging of which the rod and lever here shown form a part forms the subject-matter of the patent to G. M. Brill, dated January 29, 1891, No. 445,307. The supporting of the longitudinal rod 101 on the beam 59 brings it well out of the way of the motor. The end 103 of the rod 101 is secured to truck brake-levers, so that that end is supported, and the hanger 99 supports the opposite end, so that that part of the system will be supported even if the rod connecting the truck-brake system with the lever on the car should break.

By the word "pedestals," used herein, I mean that part of the truck structure which retains the running-gear, or, in other words, the axle-boxes, within the truck-frame, and where I have used such word I mean to include either the common horn-plate structure or the spring-post structure, all of which are well known and understood by those skilled in the art. Furthermore, I do not intend to limit myself in this application to any particular form of structure designed for the purpose of retaining the axle-boxes or running-gear within the truck-frame.

I have used the word "approximately" in explaining the relation of the truck center bearing to one of the axles. By said word I intend to include the location of the center bearing at any point between the axle referred to and the wheel-base center of the truck, but I prefer to locate said center bearing almost directly over said axle, as shown in the drawings.

The spring-plates may be omitted or made in separate pieces, and various other changes and modifications may be made in the present device without departing from the spirit of the invention herein shown and described.

What I desire to secure by Letters Patent is—

1. A truck having wheels and running-gear, a frame for the same, springs for supporting the frame on the running-gear, side bearings secured to the truck-frame, and a truck center bearing located approximately over an axle at one end of the truck, the side bearings and center bearing being arranged to precipitate the weight of the car directly upon the springs above said axle, substantially as described.

2. A truck having wheels and running-gear, a frame for the same, side bearings secured to the truck-frame, and a truck center bearing located approximately over the axle at one end of the truck, the side bearings and center bearing being arranged to precipitate the weight of the car on the truck-frame about the perpendicular axis of said axle, substantially as described.

3. A truck having wheels and running-gear, a frame for the same, side bearings secured to the truck-frame, a truck center bearing located approximately over the axle at one end of the truck, the side bearings and center bearing being arranged to precipitate the weight of the car on the truck-frame about the perpendicular axis of said axle, and a rub-plate on the end of the truck-frame farthest removed from the center bearing, substantially as described.

4. The combination of a car-body and a truck, the truck having wheels and running-gear, a frame for the same, side bearings secured to the truck-frame, coacting bearings on the car-body, a truck center bearing located approximately over the axle at one end of the truck, and a coacting center bearing on the car-body, the car and truck side bearings and center bearing being so disposed in relation to the said axle as to precipitate the weight of the car on the truck-frame about the perpendicular axis of said axle, substantially as described.

5. The combination, with a car and truck, the truck having wheels and running-gear, a frame for the same, side bearings secured to the truck-frame, a truck center bearing located approximately over the axle at one end of the truck, a rub-plate on the end of the truck-frame farthest removed from the center bearing, coacting side bearings, and a center bearing and rub-plate on the car-body, the truck and car side bearings and center bearing being arranged to precipitate the weight of the car on the truck-frame about the perpendicular axis of said axle, the end rub-plates being adapted to prevent that end of the truck-frame being lifted by such preponderance, substantially as described 6. A truck having wheels and running-gear, a frame for the same, a truck center bearing located approximately over the axle at one end of the truck, the side bearings and center bearing being arranged to precipitate the weight of the car on the truck-frame about the perpendicular axis of said axle, and springs of different capacity for supporting the truck-frame on the running-gear, the springs of greater capacity supporting that part of the truck-frame upon which the side bearings are secured, substantially as described.

7. A truck having wheels and running-gear, a frame for the same, springs of different capacity for supporting the frame on the running-gear, side bearings secured to the truck-frame, the springs of greater capacity supporting that part of the truck-frame to which the side bearings are secured, a truck-bolster secured to the truck-frame, one member of which is disposed approximately over the wheel-base center of the truck, and a center bearing supported upon the truck-bolster approximately over the axle at one end of the truck, the side bearings and center bearing being arranged to precipitate the weight of the car on the truck-frame about the perpendicular axis of said axle, substantially as described.

8. A truck having wheels and running-gear, a frame for the same, side bearings secured to the truck-frame, a truck center bearing located approximately over the axle at one end of the truck, a rub-plate on the end of the frame opposite the center bearing, and a brace secured to the truck-frame beneath the rub-plate for supporting the same, the side bearings and center bearing being arranged to precipitate the weight of the car on the truck-frame about the perpendicular axis of said axle, substantially as described.

9. A truck having wheels and running-gear, a frame for the same, springs of varying capacity for supporting the truck-frame on the running-gear, side bearings secured to the truck-frame, a truck center bearing located approximately over the axle at one end of the truck, a rub-plate secured to the truck-frame at the opposite end, a brace for supporting the truck-frame on which the end rub-plate is located, springs of greater capacity for supporting the truck-frame over which the side bearings are located, and springs of lesser capacity for supporting the end of the frame upon which the rub-plate is located, the side bearings and center bearing being arranged to precipitate the weight of the car on the truck-frame about the perpendicular axis of the axle over which the center bearing is located substantially as described.

10. A truck having wheels and running-gear, a frame for the same, springs of varying capacity for supporting the truck-frame on the running-gear, side bearings on the truck-frame, a truck-bolster having a member thereof secured to the truck-frame approximately over the wheel-base center of the truck, a truck center bearing thereon set approximately over the axle at one end of the truck, a rub-plate on the end of the truck-frame opposite the center bearing, a brace under the rub-plate for supporting that end of the truck, springs of greater carrying capacity between the side bearings and running-gear, and springs of lesser capacity for supporting the end of the truck upon which the end rub-plate is located, the side bearings and center bearing being arranged to precipitate the weight of the car on the truck-frame about the perpendicular axis of the axle over which the center bearing is located, substantially as described.

11. A truck having a frame, running-gear, wheels of varying diameter with accompanying axles supported in the running-gear, side bearings secured to the truck-frame over the axle of the larger wheels, and a truck center bearing located approximately over that axle, the side bearings and center bearing being arranged to precipitate the weight of the car on the truck about the perpendicular axis of the axle of the large wheels, substantially as described.

12. A truck having a frame, running-gear, wheels of varying diameter with accompanying axles supported in the running-gear, side bearings secured to the truck-frame over the axle of the larger wheels, a truck center bearing located approximately over that axle, and a rub-plate on the end of the truck-frame in which the smaller wheels are located, the side bearings and center bearing being arranged to precipitate the weight of the car on the truck-frame about the perpendicular axis of said axle, the end rub-plate being adapted to prevent the small wheels leaving the track, substantially as described.

13. A truck having a frame, running-gear, wheels of varying diameter with accompanying axles supported in the running-gear, springs of varying capacity for supporting the truck-frame on the running-gear, side bearings secured to the truck-frame over the axles of the larger wheels, springs of greater carrying capacity between the side bearings and the running-gear, and springs of lesser capacity for supporting the truck-frame about the smaller wheels, the side bearings and center bearing being arranged to precipitate the weight of the car-body on the truck-frame about the perpendicular axis of said axle, substantially as described.

14. A truck having a frame, wheels, and running-gear, pedestals and springs about the axle-boxes, side rub-plates for supporting the car-body on the truck, located over the axle-box pedestals at one end of the truck, and a center bearing supported on the truck approximately over the axle at that end, substantially as described.

15. A truck-frame having axle-box pedestals, a center bearing located approximately over the axle at one end, and side bearings secured to the truck-frame over the pedestals at that end, the center of said side bearings being in line with the perpendicular axis over which said bearing is located, substantially as described.

16. The combination, with a truck, of a car-body, the truck having a frame, wheels, and running-gear, pedestals and springs surrounding the axle-boxes, side rub-plates located over the axle-box pedestals at one end of the truck, a center bearing supported on the truck approximately over the axle at that end, coacting rub-plates secured to the car-body, and a center bearing on the car-body adapted to coact with the truck center bearing, the position of the car and truck center bearings and side bearings being such as to preponderate the weight of the car on the axle over which the side bearings are located, substantially as described.

17. A truck having a frame, wheels, axles, and running-gear for the same, and springs of varying capacity for supporting the truck-frame on the running-gear, the springs of greater carrying capacity supporting the truck-frame at one end thereof and springs of lesser carrying capacity supporting the springs at the opposite ends thereof, substantially as described.

18. A truck having wheels, axles, and running-gear, a frame for supporting the same, a truck center bearing located approximately over one of the axles, springs for supporting the truck-frame on the running-gear, side bearings secured to the truck-frame over the said axle, a rub-plate secured to the end of the truck-frame opposite to the center bearing, and a brace for reinforcing the said frame under the rub-plate, substantially as described.

19. A truck having wheels, axles, and running-gear, a truck-frame for carrying the running-gear, springs for supporting the truck-frame on the running-gear, a truck-bolster having a transverse member secured to the truck-frame approximately over the wheel-base center of the truck, another member spanning one of the axles and secured to the truck-frame, and a center bearing on the bolster located approximately over said axle, substantially as described.

20. A truck having wheels, axles, and running-gear, a truck-frame, springs for supporting the truck-frame on the running-gear, a truck-bolster secured to the truck-frame, having a longitudinal member spanning one of the axles, a transverse member secured upon the truck-frame approximately over the wheel-base center thereof, a center bearing on the bolster located approximately over said axle, and side bearings secured to the truck-frame over the truck-springs encompassed by the said bolster, substantially as described.

21. A truck having wheels, axles, and running-gear, a truck-frame, springs for supporting the truck-frame on the running-gear, and a truck-bolster secured to said frame and spanning one of the axles of the truck, the said bolster having a transverse member extending from its point of attachment to the truck-frame toward the said axle, and a center bearing on the bolster located approximately over said axle, substantially as described.

22. A truck having wheels, axles, and running-gear, a truck-frame, springs for supporting the truck-frame on the running-gear, a bolster secured to the truck-frame and spanning the axle at one end thereof, said bolster having a transverse member secured to the truck-frame approximately over the wheel-base center of the truck and arched therefrom toward said axle, and a center bearing on the bolster approximately over said axle, substantially as described.

23. A truck having an upper chord and an added member secured thereto and made integral therewith, substantially as described.

24. A truck having an upper chord and an added member made integral therewith, said added member following the outline of a portion of said upper chord and adapted to strengthen said upper chord at its place of attachment thereto, substantially as described.

25. An upper chord having longitudinal and transverse sections, the longitudinal sections being adapted to carry the running-gear of the truck, and an added member secured to the transverse sections for the purpose of strengthening the same, substantially as described.

26. A truck having an upper chord, an added member for strengthening the upper chord at its place of attachment thereto, and a brace secured to the added member and adapted to co-operate with said member to strengthen the upper chord at the point of attachment thereof, substantially as described.

27. In a side bearing, the combination of a friction-plate secured thereto, a reservoir for a lubricant, and means for conducting said lubricant to the surface of the friction-plate, substantially as described.

28. In a side bearing, the combination, with the body of the bearing, with an added friction-plate secured thereto, of an oil-reservoir within the body thereof, a duct leading from the reservoir to the surface of the friction-plate, and a conducting medium leading from said reservoir to the surface of said friction-plate, substantially as described.

29. In a truck, the combination, with a truck-frame, of large wheels 1, axle 2, and axle-boxes 5 at one end thereof, smaller wheels 3, axle 4, and axle-boxes 6 at the other end thereof, axle-box saddle 14 with ears 15, supported on the axle-boxes 5, axle-box 16 with ears 17, supported on the axle-boxes 6, spring-plates 12, secured to the upper chord of the frame over the axle of the large wheels, spring-plates 10, secured to said upper chord over the axle of the smaller wheels, spring-posts 18, secured to the truck-frame and passing through the ears 15 of the saddle 14, spring-posts 19, secured to the truck-frame and passing through the ears 17 of the saddle 16, and springs of varying carrying capacity for supporting the truck-frame on the saddles, the springs 43 between the saddle on the axle of the large wheels and the truck-frame being of greater carrying capacity than the springs 48 between the saddle of the axle of the smaller wheels and the truck-frame, substantially as described.

30. The combination, with the truck-frame, of wheels and axles, axle-boxes on the axles, saddles supported on the axle-boxes, spring-posts about one of the axles, passing through the saddles and secured to the truck-frame, springs surrounding the spring-posts between the saddles and the frame, and side bearings secured to the truck-frame over one of the said axles, substantially as described.

31. The wheels 1, axle 2, axle-boxes 5 on the axle 2, saddles 14 with ears 15, supported on the axle-boxes, the upper chord of the truck-frame, side bearings 63 on the upper chord of the truck-frame, the center of which is directly over the axle 2, spring-posts 18, secured to the side bearings 63, passing through the upper chord and ears 15 of the axle-box saddles 14, spring-plates 12, secured to the upper chord, and springs 43, surrounding the spring-posts 18 between the spring-plate 12 and ears 15 of the saddles, substantially as described.

32. The combination, with a truck having running-gear, a frame, springs for supporting the frame on the running-gear, pillars 28 between the upper and lower members of the truck-frame, a truck-bolster having a transverse member 59 secured to the upper chord of the frame between the pillars 28, and the longitudinal member 51, secured to the upper chord and to the transverse member 59, and a center bearing 55, secured to the member 51, substantially as described.

33. The combination, with the wheels and running-gear, a truck-frame, springs for supporting the truck-frame on the running-gear, and a truck-bolster secured to the upper member of said frame and spanning one of the axles thereof, said bolster comprising the transverse member 59, arched inwardly and upwardly toward the said axle, substantially as described.

34. A truck-bolster comprising a longitudinal member 51, secured to the upper chord of the frame at one end, extending upwardly and spanning the axle and secured upon the transverse member 59 at the other end, both members of the bolster forming an arch over one of the axles, and a center bearing on said bolster approximately over said axle, substantially as described.

35. The upper chord 9, having the added member 78 secured thereto, and a supplemental brace secured to the added member, said brace comprising the strut 83 and truss 80, substantially as described.

36. The upper chord 9, the angle-iron 78, secured to the upper chord and having the end sections 79 disposed at an angle thereto, the strut 83, having arms 84 secured to the angle-iron 78, an eye 82 on the strut, and a truss 80, passing through said eye and secured to the end sections 79 on the angle-iron 78, substantially as described.

37. In a side bearing, the well 65 therein, the slots 66 and central web 67 over the well, the friction-plate 69, having the opening 70 over said slots and central web, and an oil-conductor 71, of felt or like material, extending from the well through the slots 66 and over the central web 67, substantially as described.

38. The side bearings 63, having the oil-well 65 in the body thereof, an outwardly-extending lug 72, and a duct 73, leading from the top of said lug downwardly into said well, substantially as described.

39. The side bearings 63, having an enlarged central section 64, the oil-well 65 in said central section, slots 66 over the well, a central web 67 between the slots, a boss 68 on the said enlarged section, and a friction-plate 69, having the opening 70 above the slots 66 and web 67, seated within said boss, substantially as described.

40. The side bearings having the central enlarged section 64, the end sections 75 of reduced thickness, countersinks 77 therein, and bolt-holes 76 within the countersinks, substantially as described.

41. The combination, with the upper-chord section 7, of the side bearings 63, bolt-holes 76 therein, an outwardly-extending lug 74 on the side bearings, adapted to bear against the upper chord, and bolts for securing the side bearings to the upper chord, substantially as described.

42. The truck-frame comprising the upper chord, the spring-posts 18 19, the lower chord 27, secured to the inner spring-posts, the angle-braces 31 37, uniting the outer spring-posts with the upper chord, the reversed arch-brace 20, attached to the upper and lower chords between the inner spring-posts, and the pillars 28, extending between the brace 20 and lower chord 27 and the upper chord, and the cross-bars 35 39, extending between the spring-posts, substantially as described.

43. The bolster member 59, having the downwardly-extending link 99 secured thereto, and a brake-rod 101, supported by said link, in combination with a braking system to which both ends of the rod 101 are secured, substantially as described.

Signed at the city of New York, county of New York, and State of New York, this 17th day of February, 1892.

JOHN A. BRILL.

Witnesses:
 HERBERT F. DURBUR,
 M. E. STODDARD.